United States Patent
Van Till et al.

(10) Patent No.: US 12,367,680 B1
(45) Date of Patent: Jul. 22, 2025

(54) SINGLE CREDENTIAL ADMITTANCE APPLIED TO A PLURALITY OF INDIVIDUALS BY VIDEO IMAGE TRANSFORMATION SYSTEM AND METHOD OF OPERATION

(71) Applicant: Brivo Systems LLC, Bethesda, MD (US)

(72) Inventors: Steven Van Till, Bethesda, MD (US); Dan Greene, Bethesda, MD (US)

(73) Assignee: Brivo Systems, LLC, Bethesda, MD (US)

( * ) Notice: Subject to any disclaimer, the term of this patent is extended or adjusted under 35 U.S.C. 154(b) by 637 days.

(21) Appl. No.: 17/589,898

(22) Filed: Feb. 1, 2022

Related U.S. Application Data

(63) Continuation-in-part of application No. 17/542,362, filed on Dec. 4, 2021, and a continuation-in-part of application No. 16/442,629, filed on Jun. 17, 2019, now Pat. No. 11,222,492.

(51) Int. Cl.
*G06V 20/52* (2022.01)
*G06V 10/70* (2022.01)
*G06V 40/16* (2022.01)
*G07C 9/25* (2020.01)

(52) U.S. Cl.
CPC .............. *G06V 20/52* (2022.01); *G06V 10/70* (2022.01); *G06V 40/172* (2022.01); *G07C 9/253* (2020.01)

(58) Field of Classification Search
CPC ...... G06V 40/172; G06V 20/46; G06V 20/52; G06V 40/166; G07C 9/37
See application file for complete search history.

(56) References Cited

U.S. PATENT DOCUMENTS

| | | | | |
|---|---|---|---|---|
| 2017/0078767 | A1* | 3/2017 | Borel | G11B 27/031 |
| 2019/0355193 | A1* | 11/2019 | Kirsch | G06V 20/52 |
| 2020/0082135 | A1* | 3/2020 | Tagawa | G07C 9/10 |
| 2021/0391089 | A1* | 12/2021 | Eswara | G06V 20/53 |

* cited by examiner

*Primary Examiner* — Tom Y Lu

(57) ABSTRACT

A single credential capture event enables a plurality of persons to transit a physical access control portal. A cohort is determined when each of a plurality of persons is found within an identity indicia store. When a credential for any one of the cohort is validated, a physical access control actuator is enabled. A video stream of the plurality of persons is transformed to a plurality of best face images. When each one of the best face images is correlated with an entry in the identity indicia store above a threshold, a potential validation window is opened for the cohort. When a credential event for any of the plurality of persons occurs within the validation window, admittance is enabled through the physical access control portal. A cohort is a contiguous sequence of persons which begins with a first correlated best face and is terminated before the first uncorrelated best face.

6 Claims, 15 Drawing Sheets

SINGLE CREDENTIAL ADMITTANCE APPLIED TO A PLURALITY OF INDIVIDUALS BY VIDEO IMAGE TRANSFORMATION SYSTEM AND METHOD OF OPERATION

CROSS-REFERENCE TO RELATED APPLICATIONS

This application is a CIP of pending application Ser. No. 17/542,362 filed Dec. 4, 2021 which is in turn a CIP of allowed application Ser. No. 16/442,629 filed Jun. 17, 2019 which is incorporated by reference including its figures and benefits from its priority date.

BACKGROUND

The field of the invention is physical access control and video surveillance security services. What is needed is speedier physical transit when groups of mutually known individuals arrive at an access point of a private area to which each may individually enter singlely yet slower.

SUMMARY

A single credential capture event enables a plurality of persons to transit a physical access control portal. This speeds access when a group known to one another arrives at an access point because fewer badge reads are required to enter. It would apply to carpools, tours, teams, and busses which would encourage use of public transit.

A cohort is determined when each of a plurality of persons is found within an identity indicia store. When a contiguous sequence of "best faces" are all found in an identity store, without intervening strangers, the individuals are determined to be a cohort for physical access control purposes.

When a credential for any one of the cohort is validated, a physical access control actuator is enabled to allow the cohort to enter the private area. An example is an elevator with front and rear doors. Within this patent application, Applicant defines and uses sallyvator as a controllable ante-chamber or sally port which is used to segregate individuals who arrive as a group and seek admission from a public area to a private area under physical access control. A sallyvator includes cameras, a credential reader and means such as doors operable under portal actuator control.

A video stream of the plurality of persons is transformed to a plurality of best face images. The count of individuals is determined by analysis of the frames. A best face is cropped out of the frames for each individual.

When each one of the best face images is correlated with an entity in the identity indicia store above a threshold, a potential validation window is opened for the cohort. Every best face must be found by the identification module to create a cohort whereupon the further entry to or exit from the ante chamber is denied.

When a credential event for any of the plurality of persons occurs within the validation window, admittance is enabled through the physical access control portal. The highest access privilege of any credential read during the time period of the cohort's occupation of a sallyvator is applied to the cohort at that access point.

A cohort is a contiguous sequence of persons which begins with a first correlated best face and is terminated before the first uncorrelated best face. If two individuals arrive in close proximity and their best faces are found with high confidence an identity store, then an access decision is granted when at least one credential of the two is authenticated. When a cohort of a plurality of persons whose faces are found with high confidence in the identity store is within a sallyvator, the cohort is admitted when at least one of the credentials read is validated by the identity store.

BRIEF DESCRIPTION OF THE DRAWINGS

To further clarify the above and other advantages and features of the present invention, a more particular description of the invention will be rendered by reference to specific embodiments thereof that are illustrated in the appended drawings. Like reference numbers and designations in the various drawings indicate like elements. For purposes of clarity, not every component may be labeled in every drawing. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
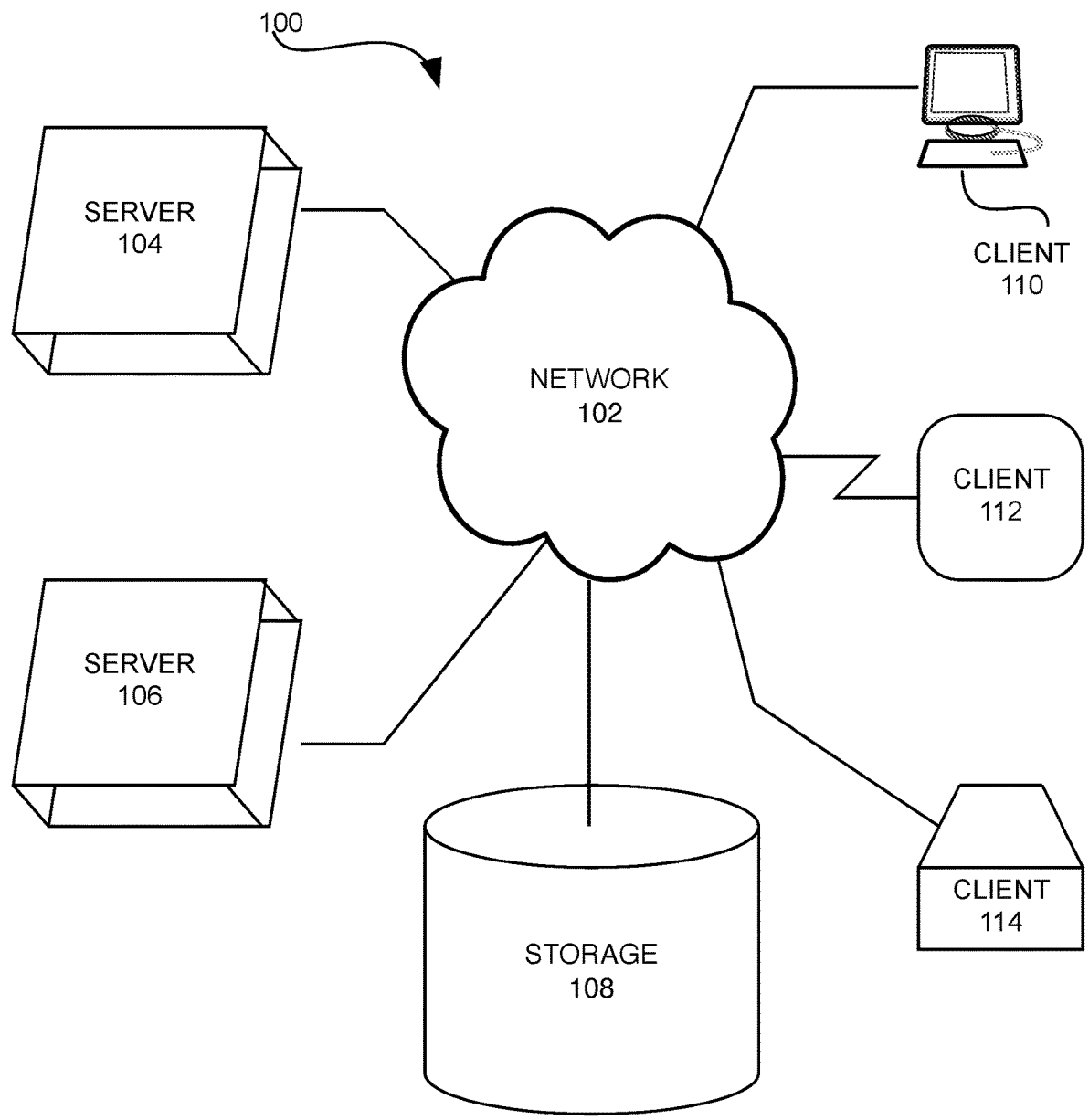
FIG. 1 is a pictorial representation of a network of data processing systems in which illustrative embodiments may be implemented.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Within this application, we define and use a video clip to refer to at least one best quality frame (qframe) and optionally one or more leading frame(s) (lframes) and one or more succeeding frame(s) (sframes) which cluster about a stream time stamp of the qframe. It can be appreciated that a video stream contains a discrete but continuous series of time stamps each associated with a frame. The object of the invention is to retrieve identity indicia and transform a stream of video surveillance images into video clips which are first matched and secondly displayed together on a console to a security operator for acceptance or rejection.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Video still frames with highest facial detection scores as provided by any one of well-known facial determination analysis services are matched and displayed to a security operator console with identity indicia retrieved upon a credential event.

Figure 5:
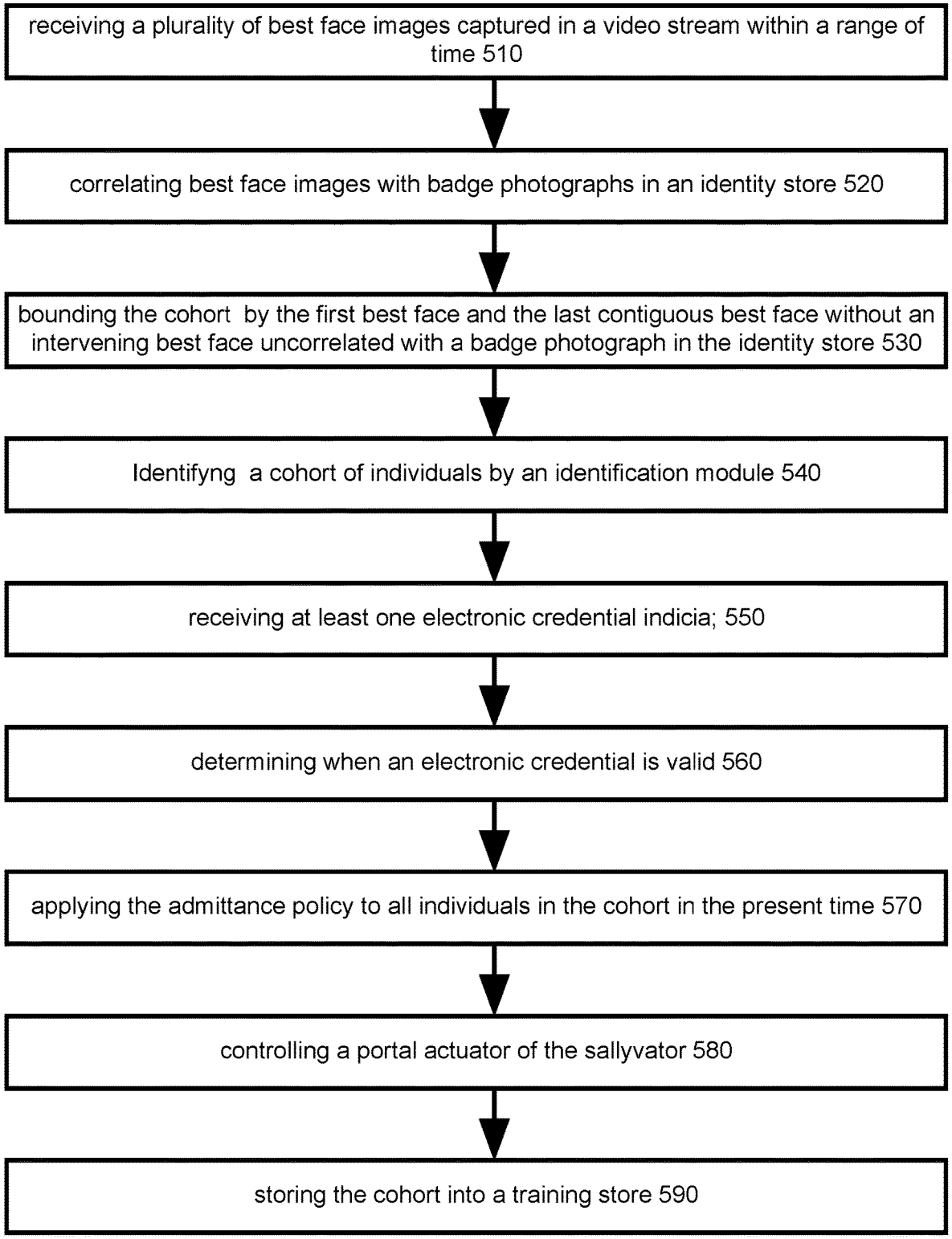
FIG. 5 is a flow chart illustrating an exemplary methodology that receives a single credential capture event which enables a plurality of persons to transit a physical access control portal.

Now referring to the Figures, FIG. 5 illustrates an exemplary methodology that enables a plurality of persons to transit a physical access control portal upon receiving a single credential capture event. A method of operation 500 for a single credential authenticating a plurality of identified individuals implemented by an information handling system that includes volatile storage and a processor performing executable instructions encoded in non-transitory media, includes the processes: receiving a plurality of best face images captured in a video stream within a range of time 510; receiving at least one electronic credential indicia; 550 and controlling a portal actuator of the sallyvator 580. The method includes: identifying 540 a cohort of individuals by an identification module correlating best face images with badge photographs in an identity store 520; and bounding the cohort 530 by the first best face and the last contiguous best face without an intervening best face uncorrelated with a badge photograph in the identity store. The method also includes determining when an electronic credential is valid 560; applying the admittance policy to all individuals in the cohort in the present time 570; and storing the cohort into a training store 590.

Figure 6:
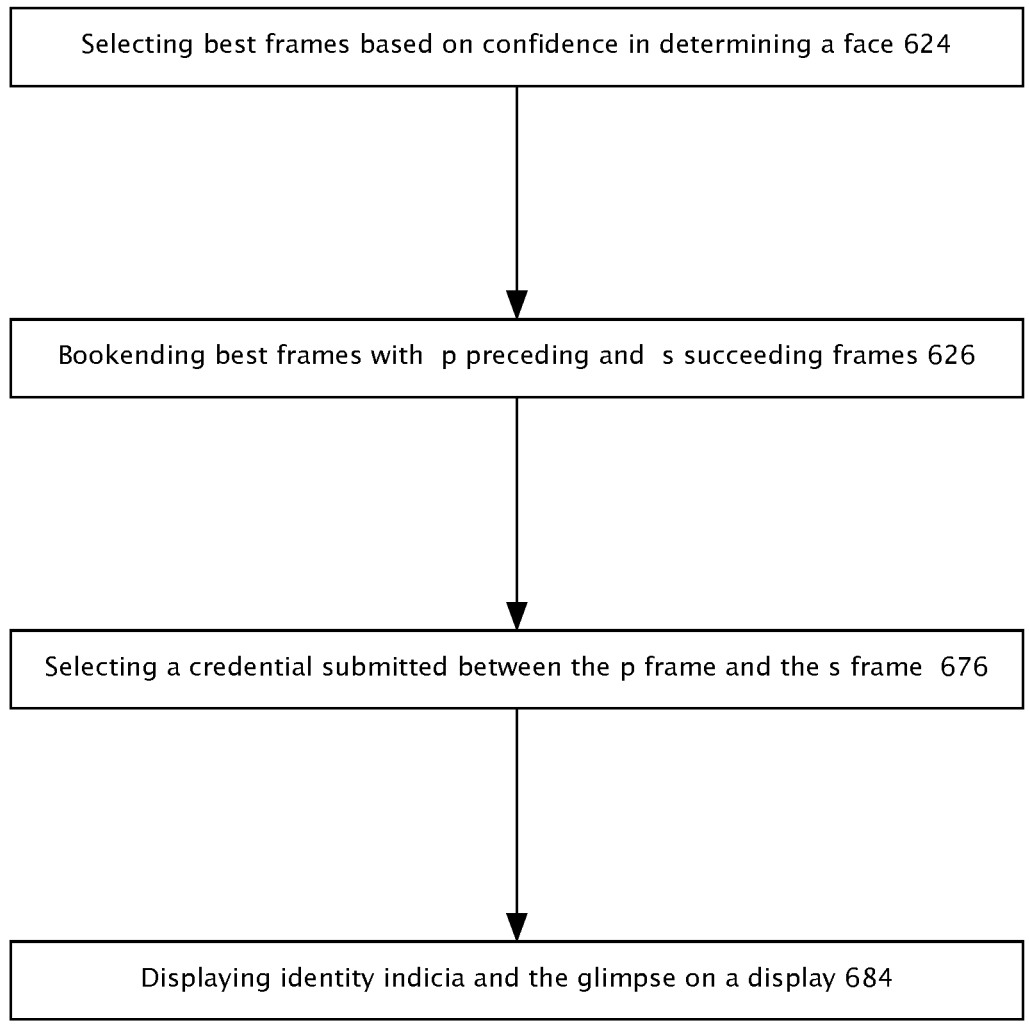
FIG. 6 is a flow chart illustrating an exemplary methodology that augments identity indicia with a video clips captured asynchronously in accordance with an aspect of the subject invention.

Referring now to FIG. 6, there is a flow diagram of an exemplary process 600 that facilitates augmenting identity indicia with a video clip captured asynchronously: selecting best quality frames based on confidence in determining a face 624; bookending each best quality frame with l leading frames and s succeeding frames 626; selecting a credential submitted between the l frame and the s frame 676; and displaying identity indicia and the clip on a display 684.

Credentials from a group of people entering together are presented to a security officer console along with video clips simultaneously containing a plurality of faces or perspectives which may be accepted en masse or in part.

Figure 7:
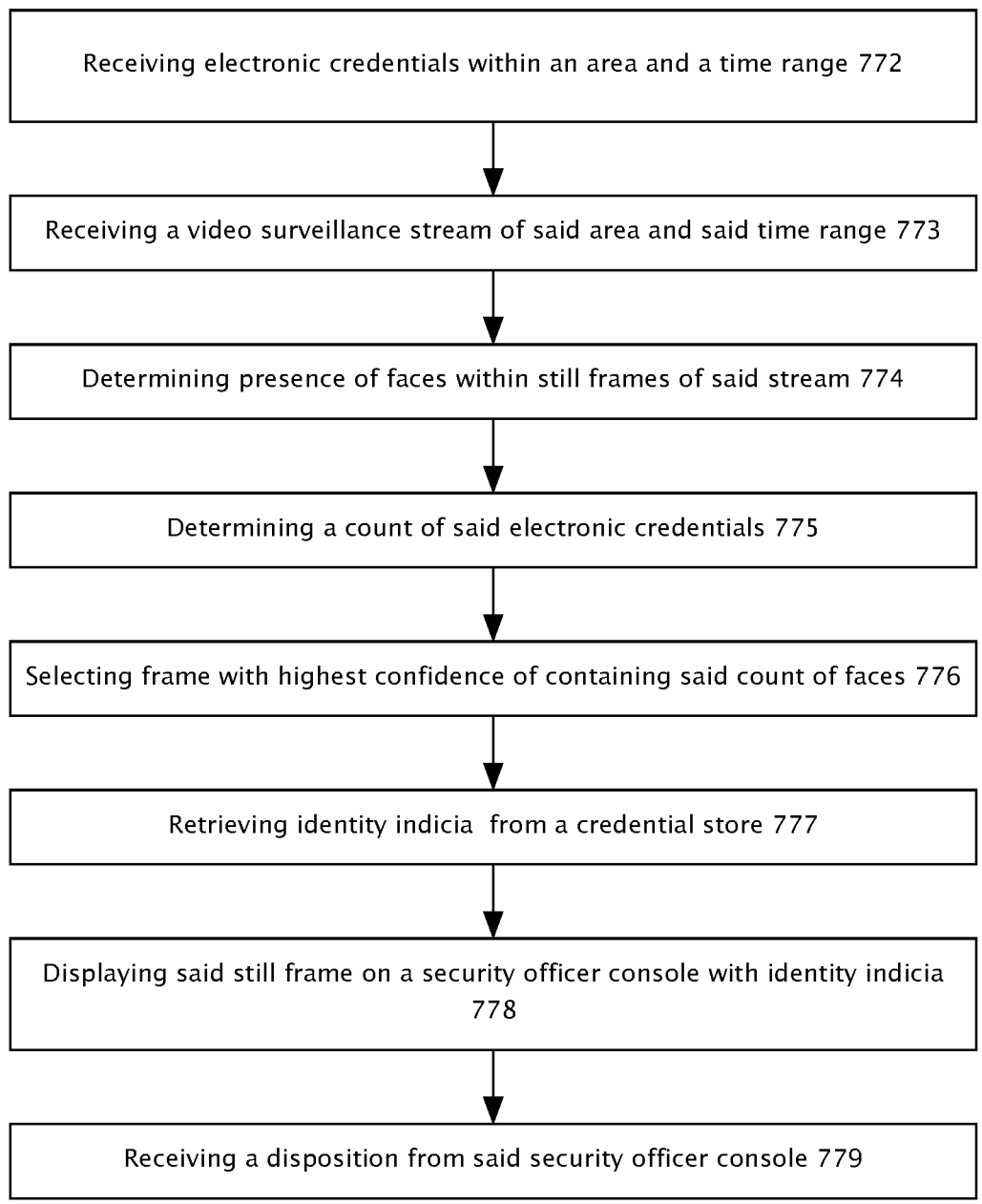
FIG. 7 is a flow chart illustrating an exemplary methodology that matches many credentials to many faces in accordance with an aspect of the subject invention.

Rather than forming single files to pass through a portal, groups of individuals, each bearing his or her own credential may transit a lobby or hallway with remote sensors capable of reading an electronic credential within a volume of space. Referring now to FIG. 7, there is a flow diagram of an exemplary process 700 that facilitates matching many credentials to many faces by: receiving a plurality of electronic credentials within an area and a time range 772, receiving a video surveillance stream of said area and said time range 773, determining presence of faces within still frames of said stream 774; determining a count of said electronic credentials 775; selecting a still frame with highest confidence of containing said count of faces 776; displaying said still frame on a security officer console with identity indicia retrieved from a credential store 777-778; and receiving a disposition from said security officer console 779.

Time shifting still frames to reconcile with credential submission time stamps increases productivity of display console users.

Because the submission of an electronic credential may involve holding a device in the vicinity of a reading device, a video surveillance camera may not capture the best quality face at that instant. The highest score for confidence level of finding a face may be in a frame captured earlier or later than the timestamp of credential submission. Thus, frames both earlier and later than access control or transiting the portal may be better for a security officer.

Figure 8:
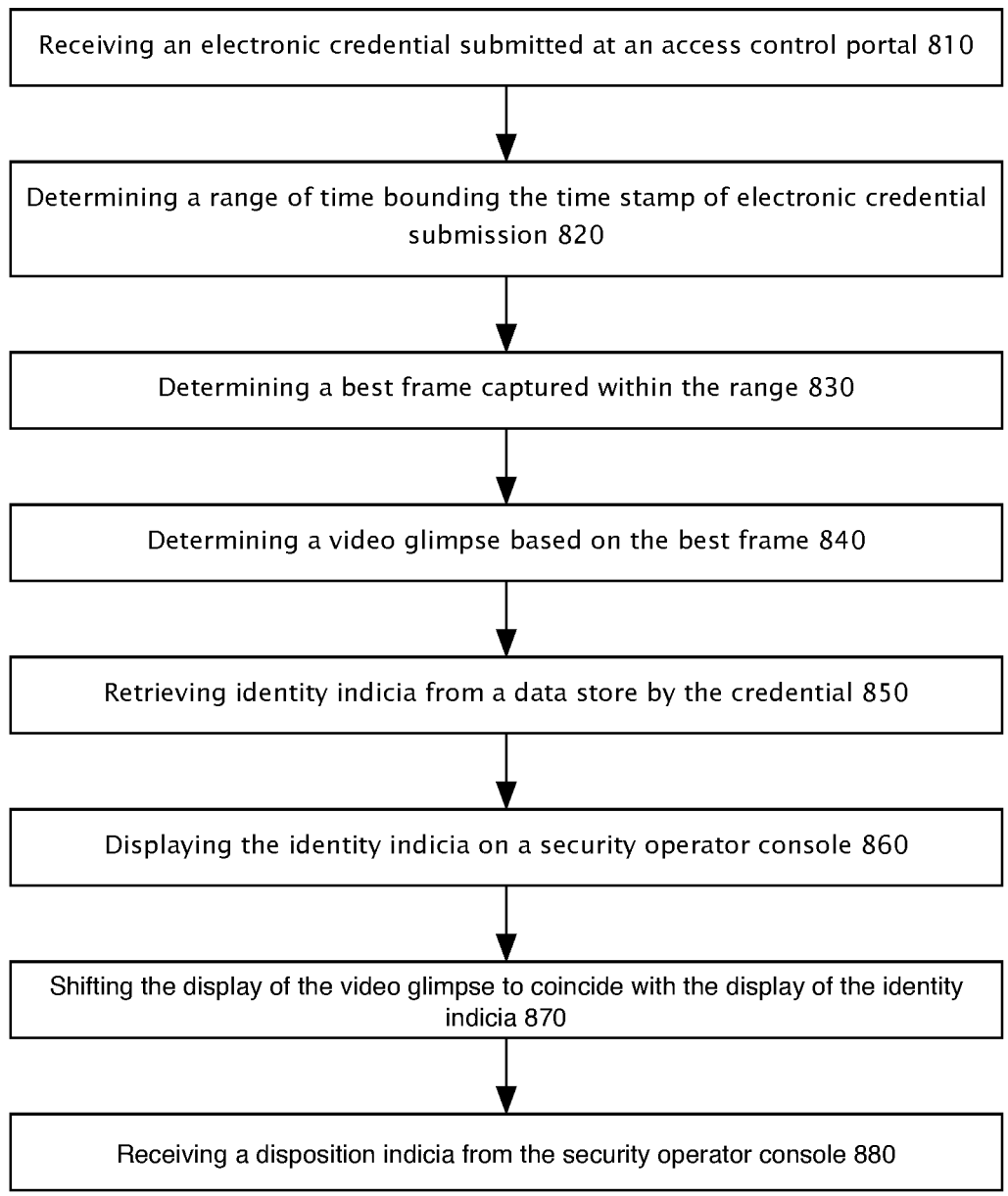
FIG. 8 is a flow chart illustrating an exemplary methodology that time shifts credential submission or image capture in accordance with an aspect of the subject invention.

Referring now to FIG. 8, there is a flow diagram of an exemplary process 800 that facilitates time shifting credential submission or image capture by: receiving an electronic credential submitted at an access control portal 810, determining a range of time bounding the time stamp of electronic credential submission 820, determining a best quality frame captured within the range 830, determining a video clip based on the best quality frame 840, retrieving identity indicia from a data store by the credential 850, displaying the identity indicia on a security operator console 860, shifting the display of the video clip to coincide with the display of the identity indicia 870, and receiving a disposition indicia from the security operator console 880.

Figure 9:
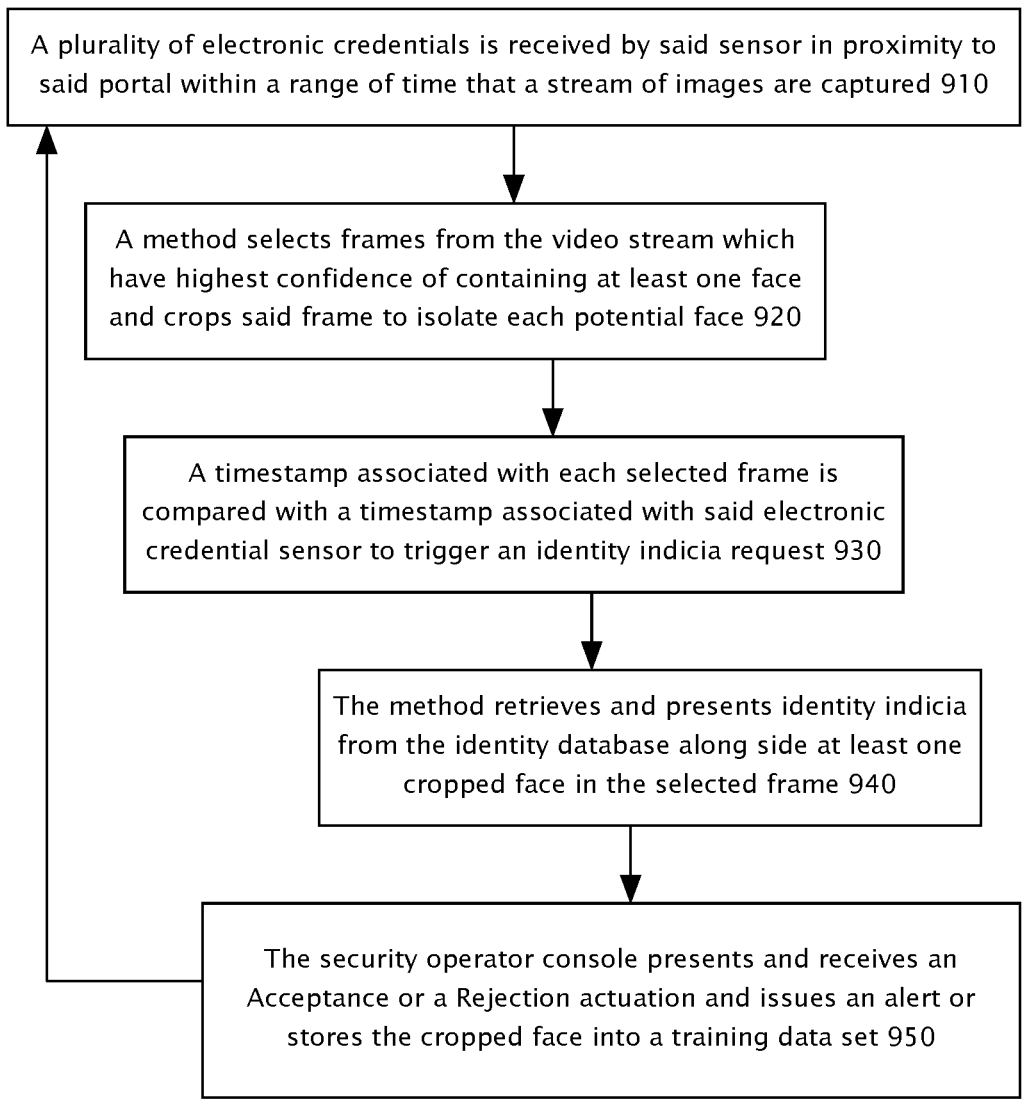
FIG. 9 discloses the major architecture of the invention as a block diagram of functions.

The apparatus controls and performs as follows and shown in FIG. 9. A plurality of electronic credentials is received by said sensor in proximity to said portal within a range of time that a first stream of images is captured 910.

A method selects frames from the video stream which have highest confidence of containing at least one face and crops said frame to isolate each potential face 920. A timestamp associated with each selected frame is compared with a timestamp associated with said electronic credential sensor to trigger an identity indicia request 930. The method retrieves and presents identity indicia from the identity database along side, above, or below at least one cropped face in the selected frame 940. The security operator console presents and receives an Acceptance or a Rejection actuation and issues an alert or stores the cropped face into a training data set 950.

Figure 10:
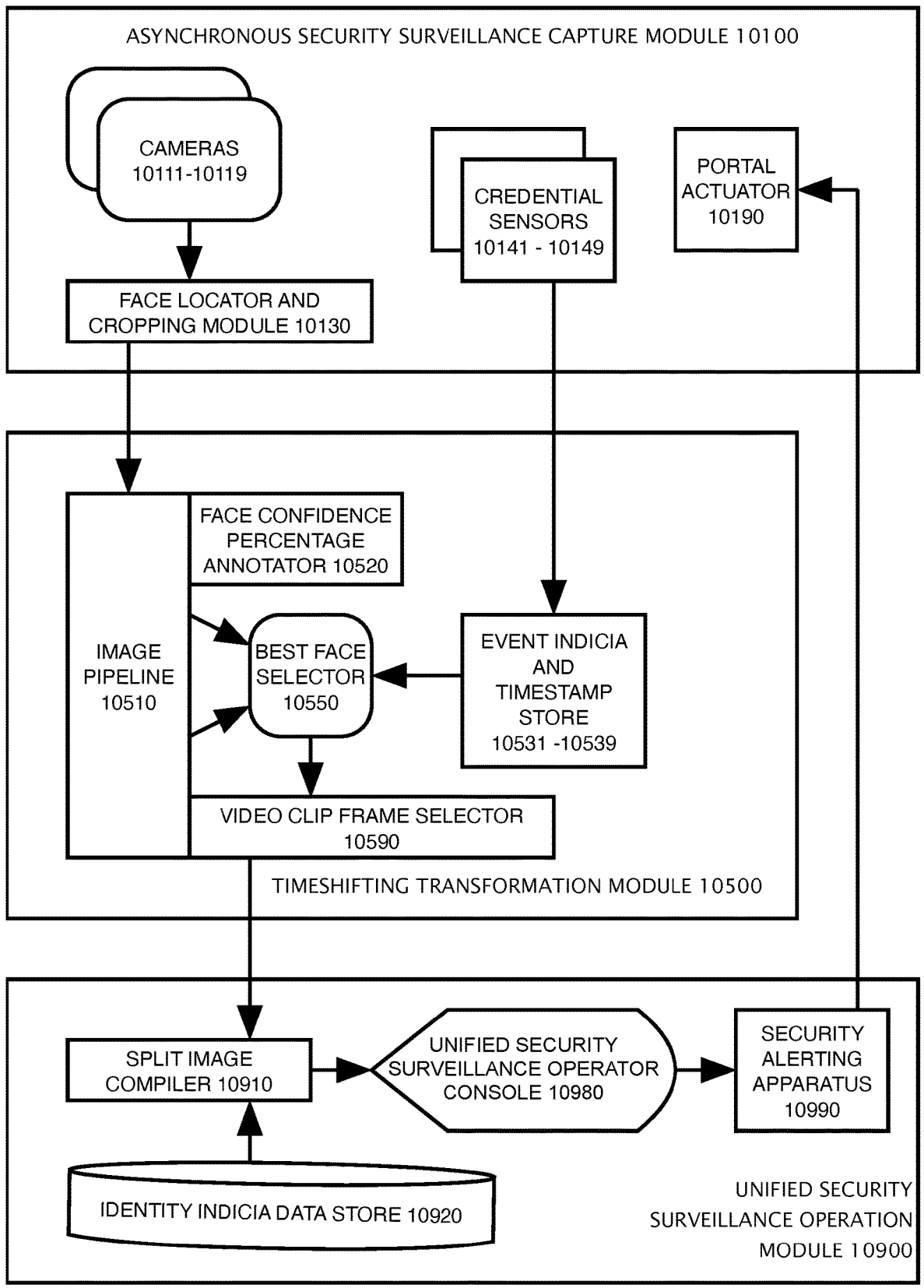
FIG. 10 is a block diagram of a system embodiment for capture, transformation, and display of best face images with identity indicia for credential sensor events received asynchronously.

Referring now to FIG. 10, a transformation system 1000 into a unified security display of asynchronously sourced facial images and identity indicia comprises: an asynchronous security surveillance capture module 10100 (capture module); a timeshifting transformation module 10500 (transformer); and a unified security surveillance operation module 10900 (uniconsole); wherein said uniconsole comprises: a split image compiler 10910; coupled to an identity indicia data store 10920; and to the video clip frame selector of the transformer 10500; a unified security surveillance operator console 10980 (console) coupled to the split image compiler; and a security alerting apparatus 10990 coupled to the console and to the portal actuator of the capture module; wherein said transformer comprises: an image pipeline 10510 (pipeline) coupled to the capture module; a face confidence percentage annotator 10520; coupled to the pipeline; at least one event indicia and timestamp store 10531-10539 (timestamp store) coupled to the at least one credential sensor of the capture module; a best face selection module 10550 (best face selector) coupled to at least one timestamp store and to the pipeline; and a video clip frame selector 10590 coupled to the pipeline and to the best face selector; wherein said capture module comprises: at least one of a plurality of cameras 10111-10119; coupled to a face locator and image cropping module 10130; at least one of a plurality of credential sensors 10141-10149; and a portal actuator 10190. In embodiments, the portal actuator causes opening or closing, changes in illumination and transparency, elevation of bollards, curtains, gates, and ramps, locking and unlocking, re-routing, direction of escalators and elevators, or changes in speed, or direction.

Figure 11:
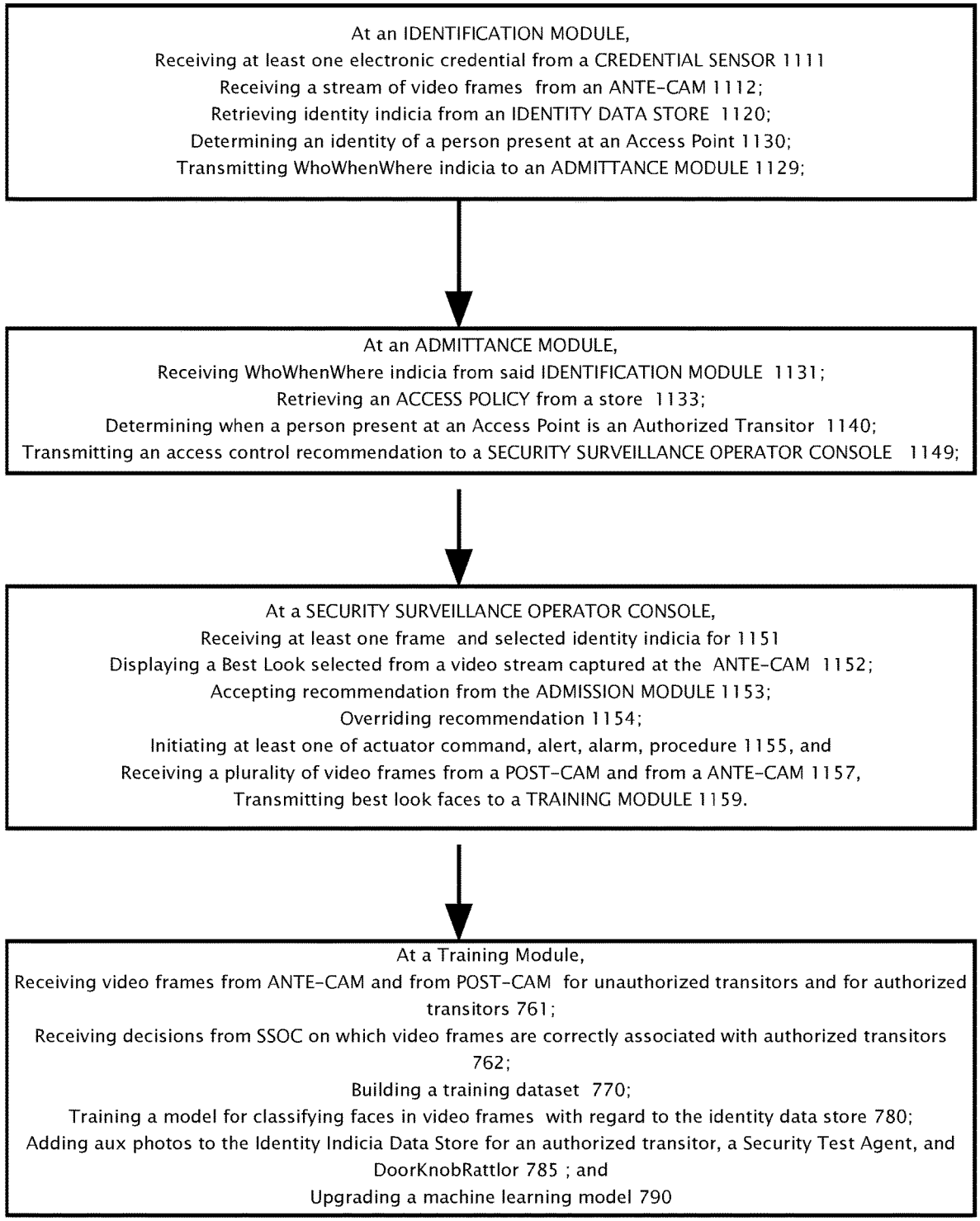
FIG. 11 is a flow chart of a method of operation for controlling a physical access point and training a face classification machine learning model.

FIG. 11 is a flowchart of a method for controlling a physical access point and training a face classification machine learning model by:

At an IDENTIFICATION MODULE, Receiving at least one electronic credential from a CREDENTIAL SENSOR 1111; Receiving a stream of video frames from at least one ANTE-CAM 1112; Retrieving identity indicia from an IDENTITY DATA STORE 1120; Determining a highly likely identity of a person present at an Access Point 1130; Transmitting WhoWhenWhere indicia to an ADMITTANCE MODULE 1129. Within this patent application, Applicants refer to WhoWhenWhere in a physical access control sense of Where meaning a particular access point, When meaning time of day and day of pay period of the requested access at that particular access point, and Who meaning the identity (if determined or indeterminant) of the requestor of access. Transistor in a physical access control sense means a person to transit through a access point possible through a portal which may be actuated to enable or deny transit.

In an embodiment, at an ADMITTANCE MODULE, receiving WhoWhenWhere indicia from said IDENTIFICATION MODULE 1131; Retrieving an ACCESS POLICY from a store 1133; Determining when a person present at an Access Point is conditionally an Authorized Transistor 1140; Transmitting an access control recommendation to a SECURITY SURVEILLANCE OPERATOR CONSOLE 1149. Within this patent application, ACCESS POLICY means whether the requestor's identity includes a role or responsibility suitable to transit at that time of day for the area controlled by the access point.

At a SECURITY SURVEILLANCE OPERATOR CONSOLE, Receiving at least one frame and selected identity indicia (if any) for person at access point 1151; Displaying a Best Look selected from a video stream captured at the ANTE-CAM 1152; Accepting recommendation from the ADMISSION MODULE 1153; Overriding recommendation 1154;

Initiating at least one of portal actuator command, alert, alarm, procedure 1155; and in an embodiment, Receiving a plurality of video frames from a POST-CAM and from a ANTE-CAM 1157; Transmitting best look faces to a TRAINING MODULE 1159. Best look corresponds to a frame having the highest confidence of containing a face according to well known methods.

In an embodiment, at a Training Module, Receiving video frames from ANTE-CAM and from POST-CAM for unauthorized transistors and for authorized transistors 1161; Receiving decisions from SSOC on which video frames are correctly associated with authorized transistors 1162; Building a training dataset 1170; Training a model for classifying faces in video frames with regard to the identity data store 780; Adding aux photos to the Identity Data Store for an Authorized Transistor, a Security Test Agent, and DoorKnobRattlor 1185; and Upgrading a machine learning model 1190. A camera positioned to capture video frames of persons near the credential scanning device exterior to the access point is an ANTE-CAM. A camera positioned to capture video frames of persons who have passed through an access point is a POST-CAM.

Figure 12:
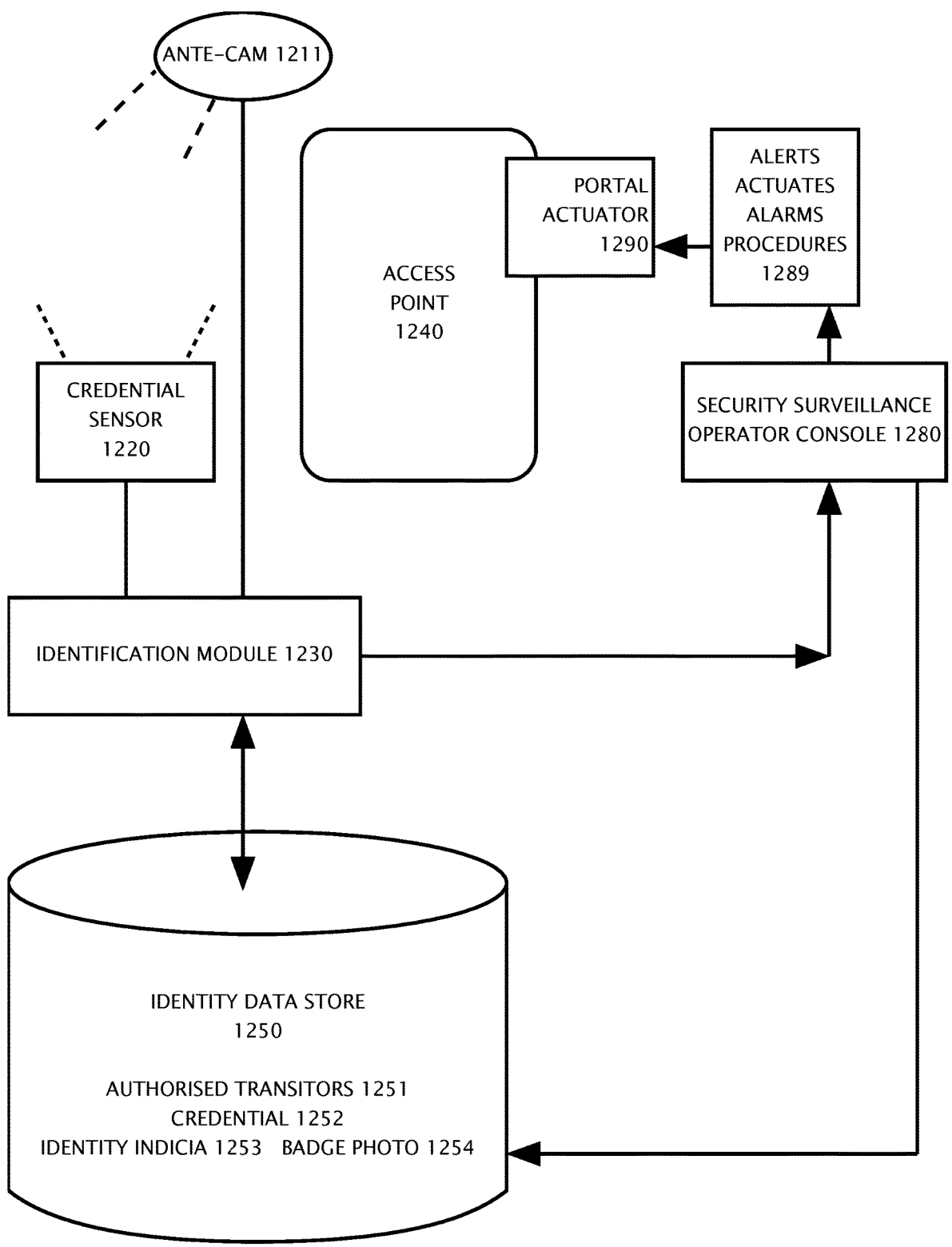
FIG. 12 is a block diagram of a basic system having a camera and credential sensor before the access point whereby a security surveillance operator can match badge photos based on the credential with a best face of video frame images taken in current time.

Referring now to FIG. 12, one aspect of the invention is a system to control physical access through an ACCESS POINT 1240. An IDENTIFICATION MODULE 1230 receives video streams and data from an ANTE-CAM 1211 and a CREDENTIAL SENSOR 1220 both positioned in the vicinity before the ACCESS POINT. The IDENTIFICATION MODULE 1230 uses the IDENTITY DATA STORE 1250 to determine based on CREDENTIAL 1252, IDENTITY INDICIA 1253, AND BADGE PHOTO 1254, using Best Look methods, a recommendation with confidence percentage when the person at the ACCESS POINT is to be allowed to enter. The result may be overridden or accepted by the SECURITY SURVEILLANCE OPERATOR and result in an ALERT 1289 or a command to PORTAL ACTUATOR 1290. In an embodiment, the IDENTIFICATION MODULE may accept a face or other identity indicia without a credential or leave the decision to the Operator. In an embodiment, the operator may add the new face into the identity data store as an auxiliary photo (not shown).

In an embodiment, the Operator may set a threshold of recommendation confidence percentage to passively accept a face and require an active acceptance for confidence percentages below said threshold.

Figure 13:
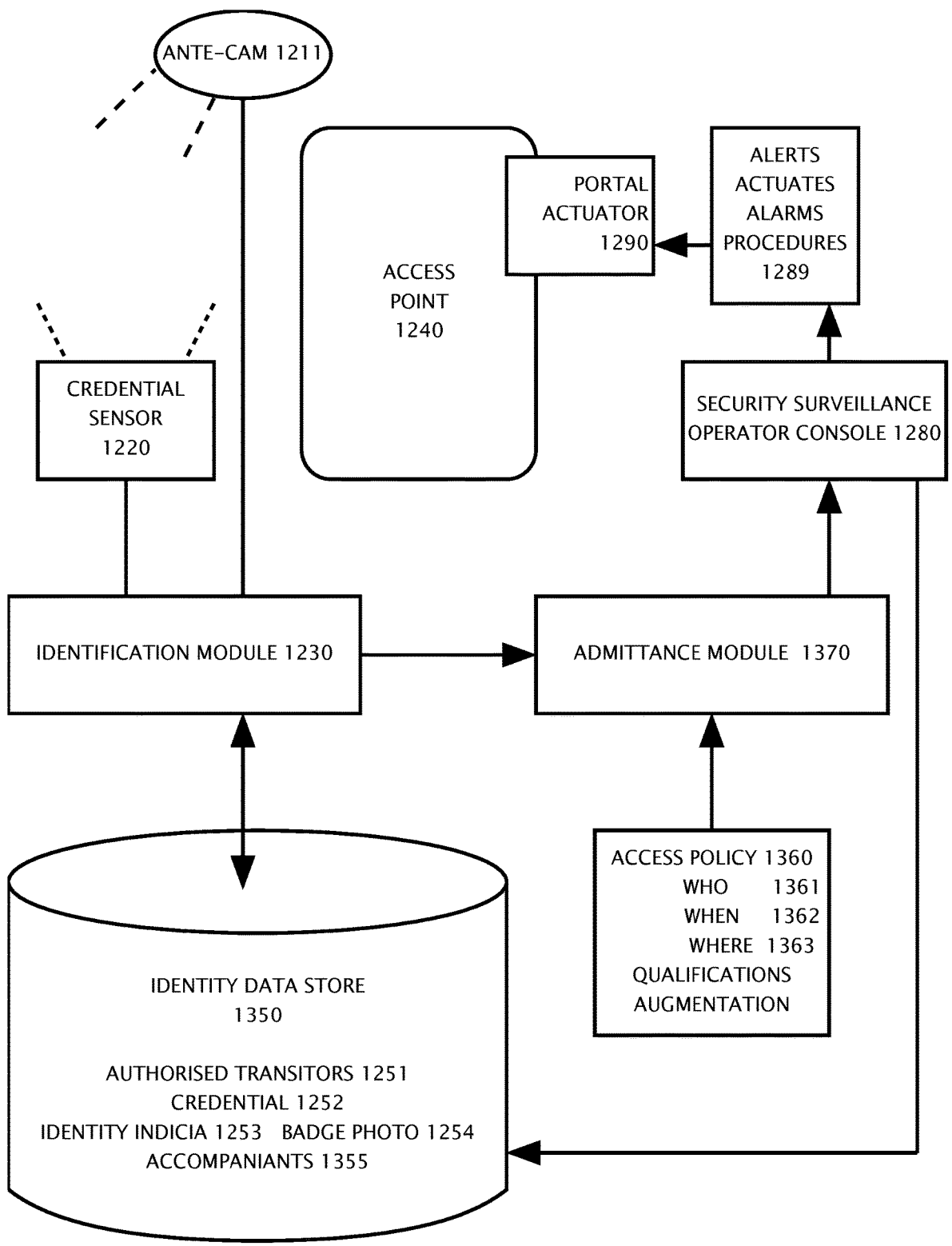
FIG. 13 is a block diagram of a system having an access policy and admittance module to recommend a decision.

Referring now to FIG. 13, in an embodiment, the system includes an ACCESS POLICY 1360 which applies Who, When, Where rules and in an embodiment may add other qualifications or be augmented for complex cases. The ACCESS POLICY is used by an ADMITTANCE MODULE 1370 which may be accepted or overridden at the OPERATOR CONSOLE to control the PORTAL ACTUATOR 1290. In an embodiment, the IDENTITY DATA STORE 1350 also includes Accompaniants 1355 who may be escorted by authorized transistors.

Figure 14:
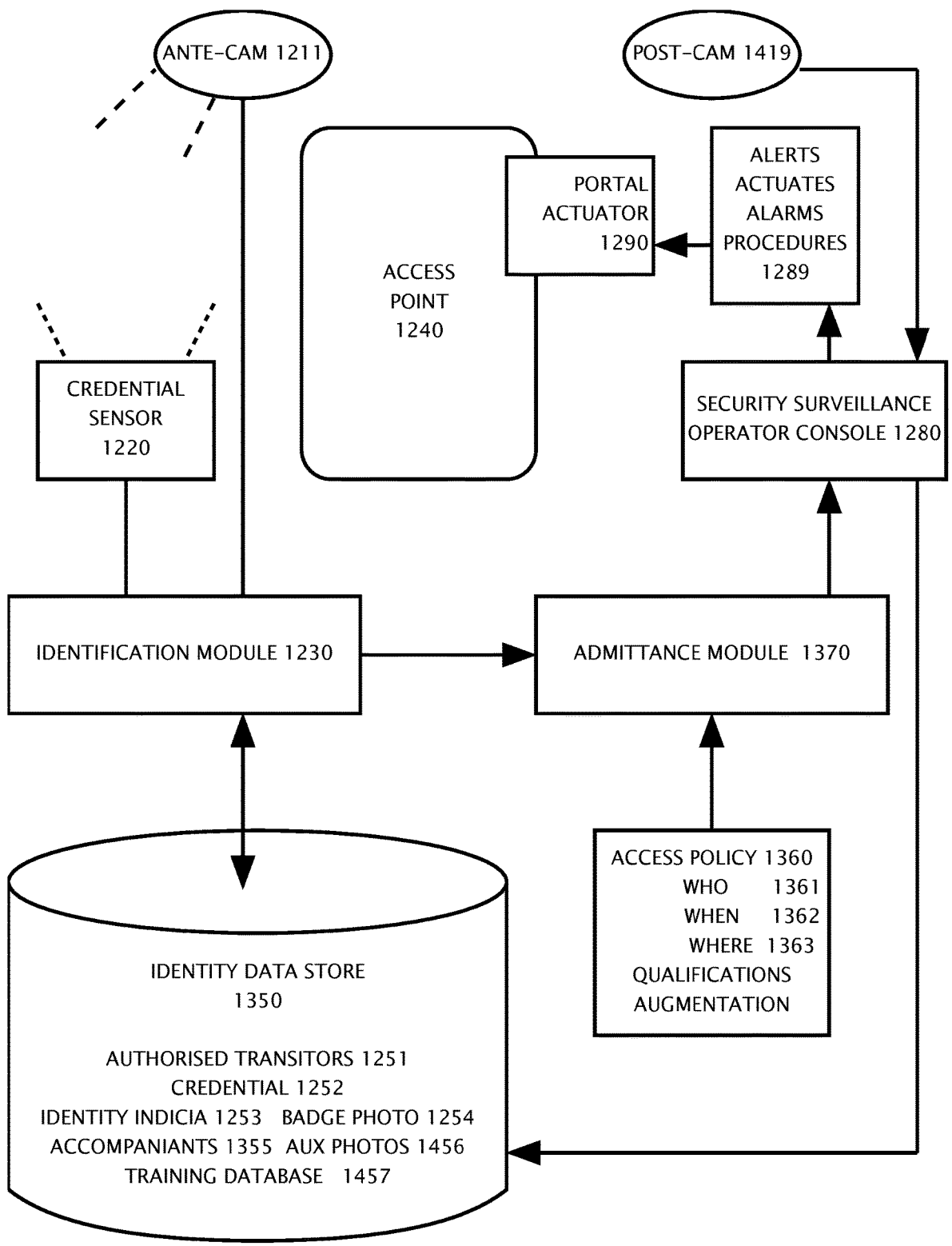
FIG. 14 is a block diagram of a system including images captured by a camera positioned behind the access point.

Referring now to FIG. 14, in an embodiment, the system includes a POST-CAM 1419 coupled to the SECURITY SURVEILLANCE OPERATOR CONSOLE 1280, whereby the operator may place faces taken at the POST-CAM into a TRAINING DATABASE 1457 which adds auxiliary photos for authorized transistors and for their accompaniments. In an embodiment, the operator may add faces taken at the ANTE-CAM when the IDENTIFICATION MODULE has recognized an authorized transitory.

Figure 15:
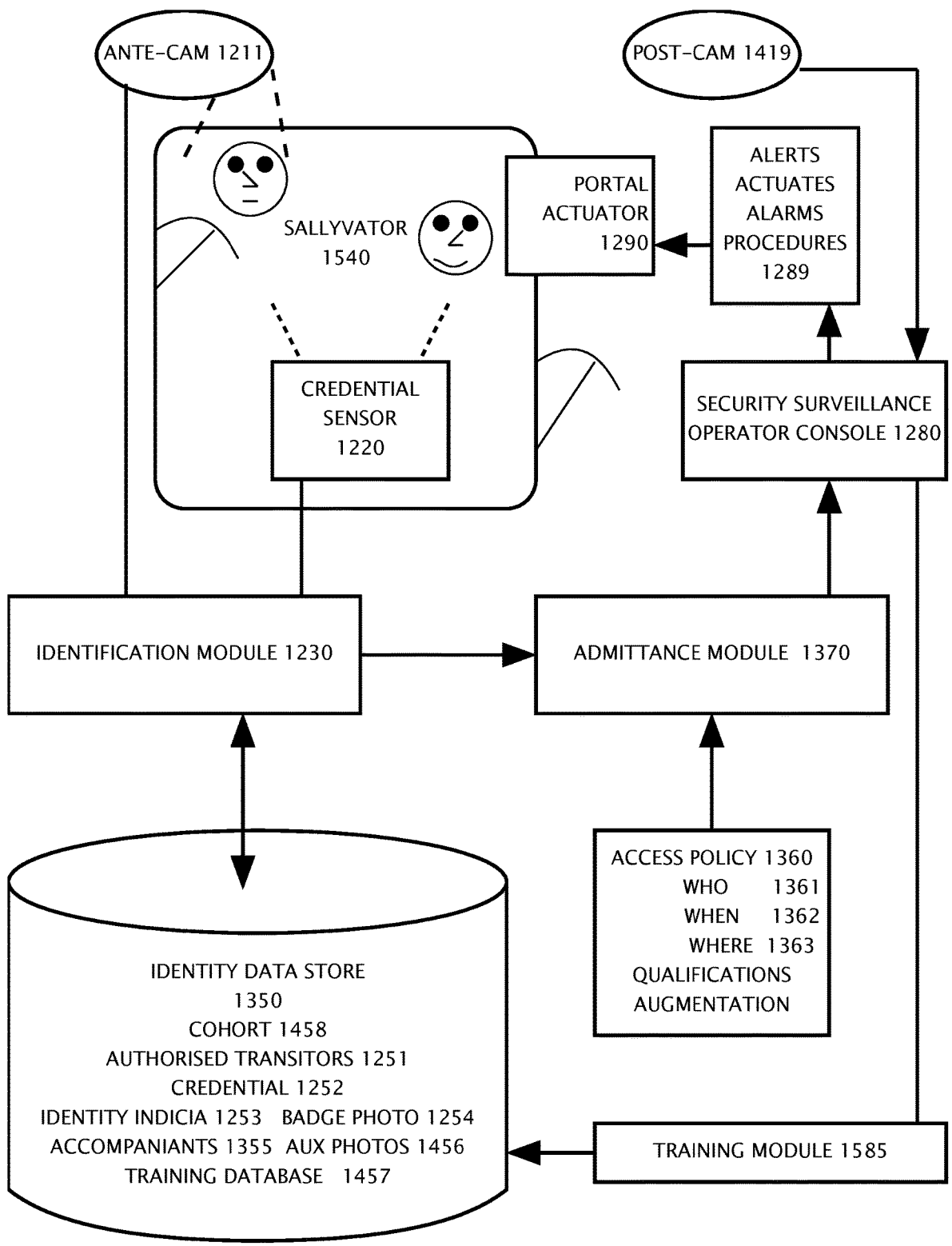
FIG. 15 is a block diagram of a system including training a machine learning for identification by photos and enabling a single credential to authenticate a plurality of persons.

Referring now to FIG. 15, in an embodiment, the system includes TRAINING MODULE 1585, which categorizes faces in the TRAINING DATABASE 1457 into auxiliary photos for authorized transistors or their accompaniments, or faces of security test agents or knob rattlers. In an embodiment, the system includes an anteroom for assembling and verifying a COHORT 1458. An example of such an anteroom is labeled SALLYVATOR 1540 which can be an elevator with a front entry from public areas and a rear exit to private or controlled areas. A COHORT is determined by the IDENTIFICATION MODULE 1230 based on best faces for individuals being found within the IDENTITY DATA STORE. When at least one credential event at the credential sensor is verified a COHORT is determined and the ADMITTANCE MODULE applies the policy of that credential to the COHORT at that time.

Embodiments of the Invention

One aspect of the invention is a system for providing physical access to a plurality of individuals including: a camera to capture a video stream of individuals arriving at an access point; a circuit to determine a count of individuals and a best face for each individual; an identification module coupled to an identity store to determine a cohort when each of the best face corresponds to a badge photograph; a portal actuator to control of their entry and egress through the access point; a credential reader activated to accept within a time period at least one electronic credential from a member of the cohort; an admittance module to apply the highest access level of the received credential to all the members in the cohort; a surveillance security operator console to concur with the admittance policy; and a processor coupled to the above, performing instructions to determine a cohort from best face images, accept at least one credential from a member of the cohort, and transmit actuator instructions to the portal controller via a surveillance system operator console; whereby a single credential capture event enables a plurality of persons to transit a physical access control portal.

Another aspect of the invention is a method of operation for a single credential authenticating a plurality of identified individuals implemented by an information handling system that includes volatile storage and a processor performing executable instructions encoded in non-transitory media, the method including: receiving a plurality of best face images captured in a video stream within a range of time; receiving at least one electronic credential indicia; and controlling a portal actuator of the sallyvator.

In an embodiment the invention includes: identifying a cohort of individuals by an identification module correlating best face images with badge photographs in an identity store; and bounding the cohort by the first best face and the last contiguous best face without an intervening best face uncorrelated with a badge photograph in the identity store.

In an embodiment the invention includes: applying the admittance policy to all individuals in the cohort in the present time; and storing the cohort into a training store.

Another aspect of the invention is an apparatus having: a sallyvator; coupled to an identification module; coupled to security surveillance operator console; coupled to a portal actuator of the sallyvator.

In an embodiment, a sallyvator further includes: at least one ante-cam and at least one credential sensor; the identification module coupled to an identity data store; and a post-cam coupled to the security surveillance operator console.

In an embodiment the invention includes: an admittance module coupled to an access policy store; coupled to the identification module and to the security surveillance operator console; a training module coupled to the identity data store and to the security surveillance operator console; and a post-cam coupled to the security surveillance operator console.

In an embodiment, said sallyvator further includes: entry means for controlling entry from a public area; retention means for controlling occupation; egress means for enabling exit into a private area; and evacuation means for free movement between public and private areas; all said means under the control of the portal actuator. Means includes powered locks and powered doors.

CONCLUSION

The claimed invention may be easily distinguished from conventional physical access control systems by application of video surveillance technology to form cohorts of known individuals and accepting and applying a credential which has highest access authority.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables. Also, network 102 may be, for example, a private network, a public network, a hybrid network, a corporate network, or the like.

In the depicted example, server 104 and server 106 connect to network 102, along with storage 108. Server 104 and server 106 may be, for example, server computers with high-speed connections to network 102. Also, it should be noted that server 104 and server 106 may represent computing nodes in a cloud environment that manages analysis services for one or more networks and their respective resources. Alternatively, server 104 and server 106 may represent clusters of servers in a data center. Further, server 104 and server 106 may provide information, such as, for example, programs, application, updates, patches, and the like, to the registered client data processing systems.

Client 110, client 112, and client 114 also connect to network 102. In this example, client 110 is shown as desktop or personal computer with wire communication links to network 102. However, it should be noted that client 110 is an example only and may represent other types of data processing systems, such as, for example, a video stream capture, a hub, a credential scanner, an optical scanner, a radio transceiver, a bridge, a laptop computer, handheld computer, smart phone, smart watch, smart television, or the like, with wire or wireless communication links to network 102. A user of client 110 may utilize client 110 to access and utilize the resources and/or services provided by client 112 and client 114. Resources may include, for example, data, documents, software such applications and programs, hardware such as processors, memory, and storage, and the like. Services may include any type of online service, such as, for example, identity services, physical access control services, motor control, storage management, network optimization, version control, network latency reduction, banking services, financial services, governmental services, insurance services, entertainment services, search services, reservation services, and the like. In addition, it should be noted that client 110 may represent a plurality of different client devices corresponding to a plurality of different users.

Clients 112 and 114 are registered clients of server 104 and server 106. In this example, client 112 and client 114 each represents a data processing system, such as a sever computer, that provides the resources and services of network 102. Further, it should be noted that client 112 and client 114 may each represent a plurality of data processing systems corresponding to one or more organizations, enterprises, institutions, agencies, and the like.

Storage 108 is a network storage device capable of storing any type of data in a structured format or an unstructured format. In addition, storage 108 may represent a plurality of network storage devices. Further, storage 108 may store identifiers and network addresses for a plurality of different network security servers, identifiers and network addresses for a plurality of different registered client devices, identifiers for a plurality of different users, and the like. Furthermore, storage unit 108 may store identities, IP and URL addresses, policies, and the like. Moreover, storage unit 108 may store other types of data, such as authentication or credential data that may include user names, passwords, images, and biometric data associated with network users, system administrators, and security analysts, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on network security server 104 and downloaded to client 112 over network 102 for use on client 112.

In the depicted example, network data processing system 100 may be implemented as a number of different types of communication networks, such as, for example, the Internet, an intranet, a local area network, a wide area network, a telecommunications network, or any combination thereof. FIG. 1 is intended as an example only, and not as an architectural limitation for the different illustrative embodiments.

Figure 2:
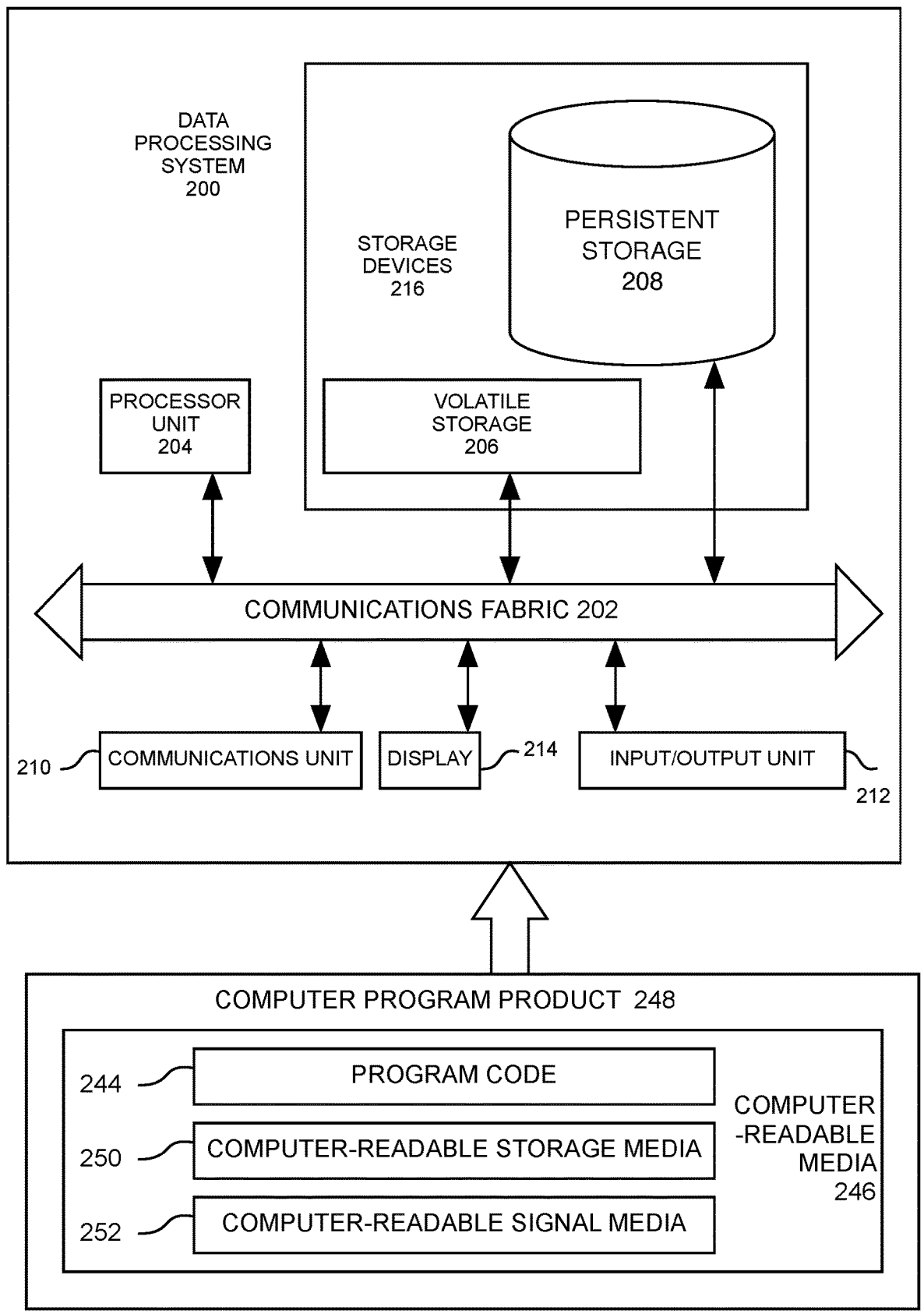
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, volatile storage 206, persistent storage 208, communications unit 210, input/output unit 212, and display 214.

Processor unit 204 serves to execute instructions for software applications and programs that may be loaded into volatile storage 206. Processor unit 204 may be a set of one or more hardware processor devices or may be a multi-core processor, depending on the particular implementation.

Volatile storage 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Volatile storage 206, in these examples, may be, for example, a random-access memory, or any other suitable non-transitory storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into volatile storage 206 for running by processor unit 204. The processes of the different embodiments may be performed by processor unit 204 using computer-implemented instructions, which may be located in a memory apparatus, such as volatile storage 206. These program instructions are referred to as program code, computer usable program code, or computer readable program code that may be read and run by a processor in processor unit 204. The program instructions, in the different embodiments, may be embodied on different physical computer readable storage devices, such as volatile storage 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor or a molecular structure.

As another example, a computer readable storage device in data processing system 200 is any hardware apparatus that may store data. Volatile storage 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, volatile storage 206 or a cache such as found in an interface and memory controller hub that may be present in communications fabric 202.

It is understood by practitioners skilled in the art that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
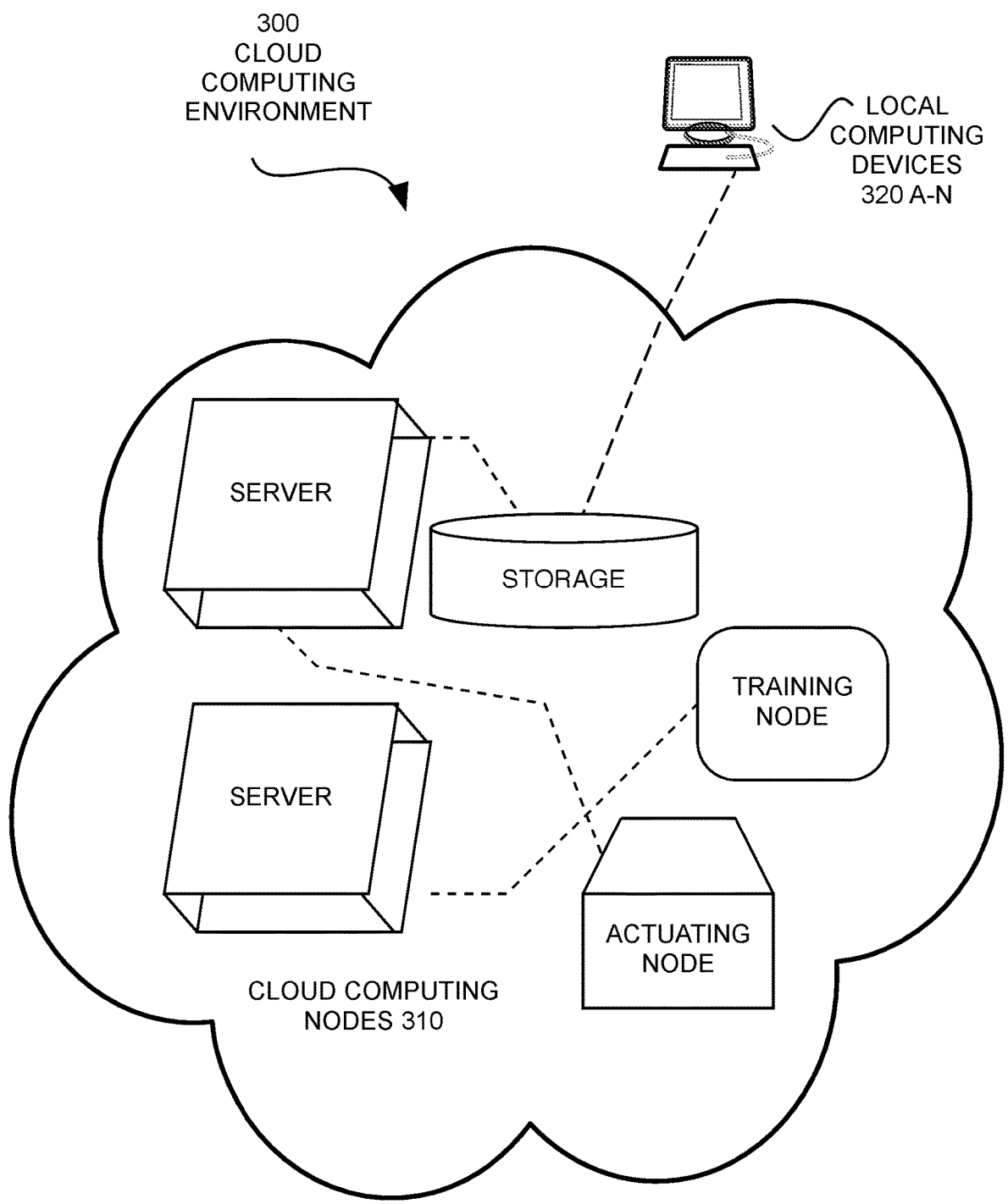
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, local computing device 320 A-N may communicate. Cloud computing nodes 310 may be, for example, server 104, server 106, client 112, and client 114 in FIG. 1. A local computing device of local computing devices 320A-320N may be, for example, client 110 in FIG. 1. Local computing devices may be stationary such as sensors and may be mobile such as vehicles, hand-carried, and body-worn/implanted.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-N. It is understood that the types of local computing devices 320A-N are intended to be illustrative only and that cloud computing nodes 310 and cloud computing environment 300 can communicate with any type of computerized device over any type of network and/or network addressable connection using a web browser or Internet Protocol, for example.

Figure 4:
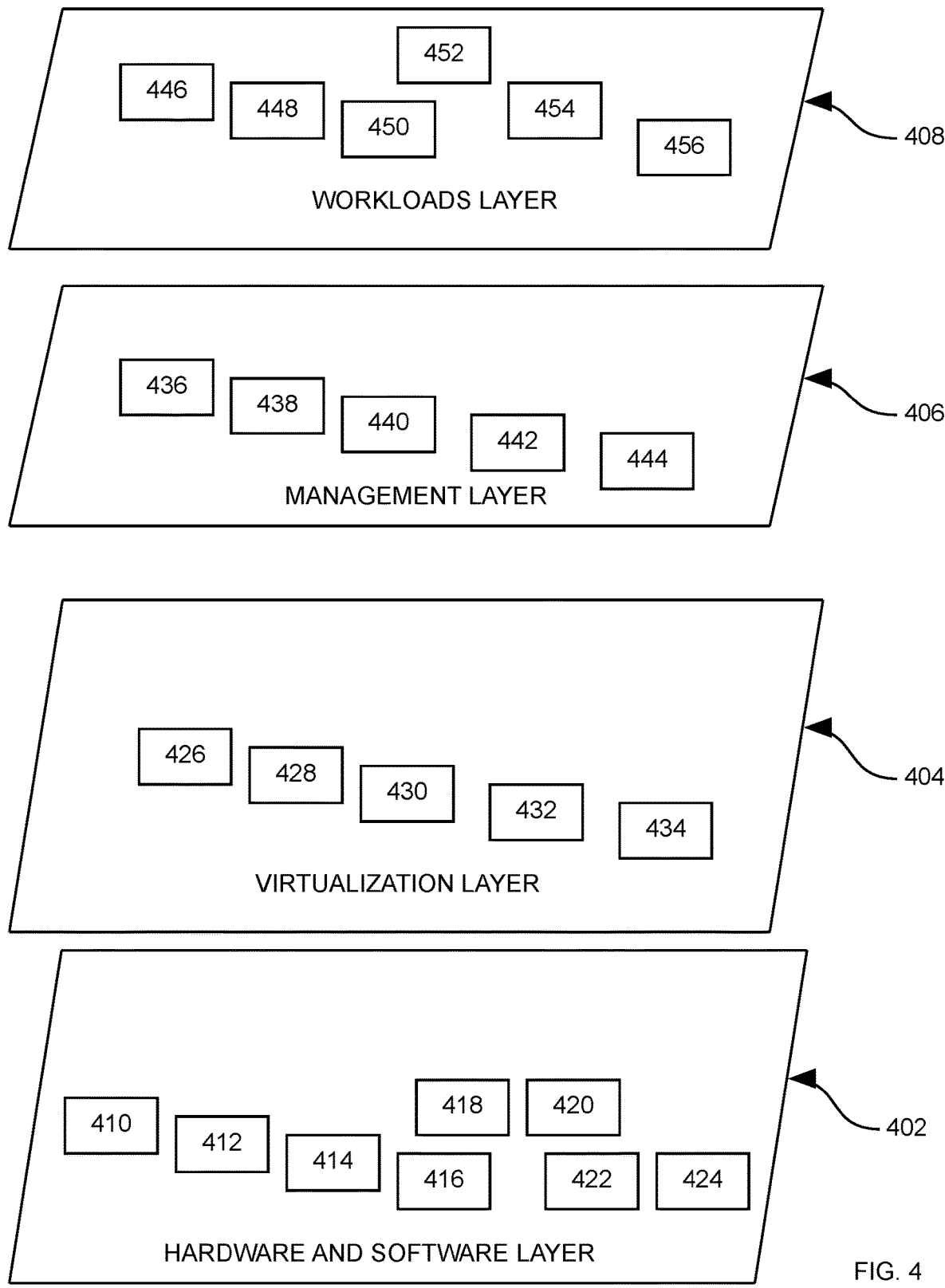
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized.

Example workloads and functions, which may be provided by workload layer 408, may include mapping and navigation 446, software development and lifecycle management 448, virtual classroom education delivery 450, data analytics processing 452, transaction processing 454, and security management 456.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to providing interactive content for display, the systems and methods described herein can include applied to other environments in which data included in a log database used and compared to data corresponding to previous requests for content and responsive to determining a change in the data, identifying one or more content elements to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

We claim:

1. A system for providing physical access to a plurality of individuals comprising:
   a camera to capture a video stream of individuals arriving at an access point;
   a circuit to determine a count of individuals and a best face for each individual;
   an identification module coupled to an identity store to determine a cohort when each of the best face corresponds to a badge photograph;
   a portal actuator to control entry and egress through the access point;
   a credential reader activated to accept within a time period at least one electronic credential from a member of the cohort;
   an admittance module to apply the highest access level of the received credential to all the members in the cohort;
   a surveillance security operator console to concur with the admittance policy; and
   a processor coupled to the above, performing instructions to determine a cohort from best face images, accept at least one credential from a member of the cohort, and transmit actuator instructions to the portal controller through a surveillance system operator;
   whereby a single credential capture event enables a plurality of persons to transit a physical access control portal.

2. A method of operation for a single credential authenticating a plurality of identified individuals implemented by an information handling system that includes volatile storage and a processor performing executable instructions encoded in non-transitory media, the method comprising:
   receiving a plurality of best face images captured in a video stream within a range of time;
   identifying a cohort of individuals by an identification module correlating best face images with badge photographs in an identity store;
   bounding the cohort by the first best face and the last contiguous best face without an intervening best face uncorrelated with a badge photograph in the identity store;

receiving at least one electronic credential indicia; and
controlling a portal actuator of a sallyvator.

3. The method of claim 2, further comprising:
determining when an electronic credential is valid;
applying the admittance policy to all individuals in the cohort in the present time; and
storing the cohort into a training store.

4. An apparatus comprising:
a credential sensor positioned in a vicinity of an access point, the credential sensor configured to capture information of a person requesting access;
a first camera positioned to capture video frames of one or more persons near the credential sensor, the one or more persons near the credential sensor including the person requesting access;
an identification module coupled to the first camera and the credential sensor;
an identity data store, wherein the identification module is configured to retrieve identity indicia of the person requesting access from the identity data store;
an access policy store storing an access policy for a person requesting access;
an admittance module coupled to the access policy store, wherein the identification module is configured to transmit information including an access point, a time of day and the identity of the person requesting access to the admittance module;
a security surveillance operator console coupled to the first camera and the identification module;
a portal actuator;
a second camera positioned to capture video frames of the one or more persons who have passed through the access point; and
a training module coupled to the identity data store and the security surveillance operator console.

5. The apparatus of claim 4 wherein the portal actuator is configured to control one or more of:
a portal for controlling entry from a public area;
a portal for controlling occupation;
a portal for enabling exit into a private area; and
a portal for free movement between public and private areas.

6. The apparatus of claim 4, wherein the first camera is positioned exterior to the access point.

* * * * *